(12) United States Patent
Kim

(10) Patent No.: US 12,139,117 B2
(45) Date of Patent: Nov. 12, 2024

(54) VEHICLE BRAKE APPARATUS

(71) Applicant: HYUNDAI MOBIS Co., Ltd., Seoul (KR)

(72) Inventor: Jong Sung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 17/689,559

(22) Filed: Mar. 8, 2022

(65) Prior Publication Data

US 2023/0166707 A1    Jun. 1, 2023

(30) Foreign Application Priority Data

Nov. 26, 2021    (KR) .......................... 10-2021-0165352

(51) Int. Cl.
| | |
|---|---|
| *B60T 13/74* | (2006.01) |
| *B60T 1/06* | (2006.01) |
| *F16D 55/22* | (2006.01) |
| *F16D 55/226* | (2006.01) |
| *F16D 65/18* | (2006.01) |
| *F16D 121/24* | (2012.01) |

(Continued)

(52) U.S. Cl.
CPC ............ *B60T 13/746* (2013.01); *B60T 1/065* (2013.01); *F16D 55/226* (2013.01); *F16D 65/18* (2013.01); *F16D 2121/24* (2013.01); *F16D 2125/40* (2013.01); *F16D 2125/48* (2013.01)

(58) Field of Classification Search
CPC ........ B60T 13/746; B60T 1/065; B60T 1/005; F16D 65/18; F16D 2121/24; F16D 55/226; F16D 2125/48; F16D 2125/40; F16D 63/006; F16D 65/183; F16D 65/567

See application file for complete search history.

(56) References Cited

U.S. PATENT DOCUMENTS 3,613,356 A * 10/1971 Woodward ............... G01F 23/32
188/106 P
4,175,646 A * 11/1979 Eikelberger .......... B60T 13/745
188/162

(Continued)

FOREIGN PATENT DOCUMENTS

| JP | 2016-217415 A | 12/2016 |
|---|---|---|
| KR | 10-2010-0098846 A | 9/2010 |
| KR | 10-2021-0001765 A | 1/2021 |

OTHER PUBLICATIONS

Office Action issued Jun. 20, 2023 for corresponding Korean Patent Application No. 10-2021-0165352.

*Primary Examiner* — Bradley T King
*Assistant Examiner* — James K Hsiao
(74) *Attorney, Agent, or Firm* — Morgan, Lewis & Bockius LLP

(57) ABSTRACT

A vehicle brake apparatus may include: a drive unit configured to generate a drive force; a transmission gear unit rotatable with the drive force transmitted from the drive unit; a piston unit movable forward or backward in conjunction with a rotation of the transmission gear unit, and configured to press or no longer press a pad unit according to a direction in which the piston unit moves; a disc unit rotatable together with the transmission gear unit in conjunction with the drive force of the drive unit; and a restriction unit mounted to be movable toward the disc unit, and configured to restrict a rotation of the disc unit by being brought into frictional contact with the disc unit during parking braking.

10 Claims, 9 Drawing Sheets

(51) Int. Cl.
*F16D 125/40* (2012.01)
*F16D 125/48* (2012.01)

(56) References Cited

U.S. PATENT DOCUMENTS

| | | | | |
|---|---|---|---|---|
| 4,193,467 A * | 3/1980 | Simmons | ............... | B60T 1/062 |
| | | | | 188/18 R |
| 6,068,091 A * | 5/2000 | Finley | ................... | B60T 1/065 |
| | | | | 188/73.31 |
| 6,173,820 B1 * | 1/2001 | Blosch | ................. | F16D 65/567 |
| | | | | 188/71.8 |
| 6,412,608 B1 * | 7/2002 | Mohr | ..................... | F16D 65/18 |
| | | | | 188/72.8 |
| 6,655,507 B2 * | 12/2003 | Miyakawa | ........... | B60T 13/746 |
| | | | | 188/162 |
| 6,755,284 B2 * | 6/2004 | Revelis | ................. | B60T 13/746 |
| | | | | 188/73.1 |
| 7,516,822 B2 * | 4/2009 | Kramer | ................ | B60T 13/741 |
| | | | | 188/162 |
| 8,387,759 B2 * | 3/2013 | Prix | .................... | F16H 63/3416 |
| | | | | 192/219.5 |
| 9,528,563 B2 * | 12/2016 | Balz | ....................... | F16D 65/18 |
| 2008/0053760 A1 * | 3/2008 | Oikawa | ................... | F16D 65/18 |
| | | | | 188/72.4 |
| 2009/0065311 A1 * | 3/2009 | Kim | ...................... | B60T 13/746 |
| | | | | 188/72.7 |
| 2012/0168275 A1 * | 7/2012 | Morisawa | .............. | B60T 1/062 |
| | | | | 192/219.5 |
| 2012/0234640 A1 * | 9/2012 | Jung | ...................... | F16D 65/28 |
| | | | | 188/325 |
| 2014/0000992 A1 * | 1/2014 | Tajima | ................... | B60T 1/005 |
| | | | | 188/72.1 |
| 2015/0330466 A1 * | 11/2015 | Masuda | ................ | B60T 13/741 |
| | | | | 188/72.1 |
| 2015/0345580 A1 * | 12/2015 | Jung | ..................... | B60T 13/02 |
| | | | | 188/162 |
| 2017/0114848 A1 * | 4/2017 | Park | .................... | B60T 13/741 |
| 2018/0328430 A1 * | 11/2018 | Feigel | ................... | B60T 13/746 |
| 2020/0180582 A1 * | 6/2020 | Stohr | .................... | F16D 65/183 |
| 2022/0297660 A1 * | 9/2022 | Lim | ...................... | F16D 55/226 |
| 2022/0396253 A1 * | 12/2022 | Karajgi | ................ | B60T 13/741 |

* cited by examiner

VEHICLE BRAKE APPARATUS

CROSS-REFERENCE TO RELATED APPLICATION

This application claims priority from and the benefit of Korean Patent Application No. 10-2021-0165352, filed on Nov. 26, 2021, which is hereby incorporated by reference for all purposes as if set forth herein.

BACKGROUND

Field

Exemplary embodiments of the present disclosure relate to a vehicle brake apparatus, and more particularly, to a vehicle brake apparatus which converts a force applied to a pedal by a driver into an electrical signal and thus generates a braking force.

Discussion of the Background

Generally, vehicle brake apparatuses brake a vehicle using a frictional force between a pad and a disc that is produced by pushing a piston with a drive force and thus bringing the pad and the disc into close contact with each other.

Among these apparatuses, an electro-mechanical brake (EMB) is an apparatus which has a motor actuator directly mounted in a caliper without using hydraulic pressure and presses the piston through mechanisms, such as a gear or a screw, and thus generates a braking force. The EMB has the following advantages. The EMB is capable of performing active braking and independent braking for each wheel. Thus, the EMB is capable of not only performing general primary braking, but also realizing supplementary functions through ABS, ESC, TCS, AEB, and the like. Furthermore, the EMB is capable of achieving high performance because no delay is caused in hydraulic pressure transmission.

The EMB in the related art ensures quick responsiveness and high efficiency of the piston through a ball screw. However, due to its structural characteristics, it is impossible for the ball screw to perform self-locking that can restrict its rotation. Thus, in a case where supply of electric power to a motor is interrupted, there occurs a problem in that the braking force is arbitrarily no longer applied due to repulsive forces of the pad and the piston.

The related art of the present disclosure is disclosed in Korean Patent Application Publication No. 10-2010-0098846 (published on Sep. 10, 2010 and titled "DISK BRAKE HAVING PARKING FUNCTION").

SUMMARY

Various embodiments are directed to a vehicle brake apparatus capable of stably maintaining a state where parking brake is applied.

In an embodiment, a vehicle brake apparatus includes: a drive unit configured to generate a drive force; a transmission gear unit rotatable with the drive force transmitted from the drive unit; a piston unit moved forward or backward in conjunction with a rotation of the transmission gear unit, and configured to press or no longer press a pad unit according to a direction in which the piston unit is moved; a disc unit rotatable together with the transmission gear unit in conjunction with the drive force of the drive unit; and a restriction unit mounted to be movable toward the disc unit, and configured to restrict a rotation of the disc unit by being brought into frictional contact with the disc unit during parking braking.

In an embodiment, the restriction unit may include: a parking drive unit configured to generate a drive force; a spindle unit rotatable with the drive force transmitted from the parking drive unit; and a clamp unit arranged to face the disc unit, and brought into contact with or separated from the disc unit in conjunction with a rotation of the spindle unit.

In an embodiment, the clamp unit may include: a first clamp member arranged to face a first surface of the disc unit, and moved in a straight line along a longitudinal direction of the spindle unit when the spindle unit rotates; and a second clamp member arranged to face a second surface of the disc unit, and moved in a straight line in a direction opposite to the first clamp member when the spindle unit rotates.

In an embodiment, the clamp unit may further include: a first friction member protruding toward the first surface of the disc unit from the first clamp member, and brought into close contact with the first surface of the disc unit as the first clamp member is moved by a predetermined distance or more toward the disc unit; and a second friction member protruding toward the second surface of the disc unit from the second clamp member, and brought into close contact with the second surface of the disc unit as the second clamp member is moved by a predetermined distance or more toward the disc unit.

In an embodiment, the spindle unit may include: a spindle member rotatable together with an output shaft of the parking drive unit; a first conversion unit arranged on a first side of the spindle member and configured to convert a rotational motion of the spindle member into a straight-line motion of the first clamp member; and a second conversion unit arranged on a second side of the spindle member and configured to convert the rotational motion of the spindle member into a straight-line motion of the second clamp member.

In an embodiment, the spindle member may be arranged in such a manner that a longitudinal direction thereof is in parallel to a central axis of the disc unit.

In an embodiment, one of the first conversion unit and the second conversion unit may have a shape of a clockwise screw, and a remaining one of the first conversion unit and the second conversion unit may have a shape of a counter-clockwise screw.

In an embodiment, the restriction unit may further include a stopper unit brought into contact with the clamp unit and configured to restrict a rotation of the clamp unit.

In an embodiment, the transmission gear unit may include: a first transmission gear unit rotatable together with an output shaft of the drive unit; a second transmission gear unit engaged with the first transmission gear unit for being combined therewith, and rotatable in conjunction with a rotation of the first transmission gear unit; and a third transmission gear unit engaged with the second transmission gear unit for being combined therewith, rotatable in conjunction with a rotation of the second transmission gear unit, and configured to transmit a rotational force to the piston unit.

In an embodiment, the disc unit may be connected to the output shaft of the drive unit and may rotate at the same angular speed as the first transmission gear unit.

In an embodiment, the disc unit may be mounted to be movable along a longitudinal direction of the output shaft of the drive unit within a predetermined distance range.

In an embodiment, the disc unit may be spline-combined with the output shaft of the drive unit.

In an embodiment, the piston unit may include: a ball screw unit rotatable by being connected to the transmission gear unit; a ball nut unit reciprocating in a straight line along a longitudinal direction of the ball screw unit in conjunction with a rotation of the ball screw unit; and one or more rolling elements arranged between the ball screw unit and the ball nut unit and brought into rolling contact with the ball screw unit and the ball nut unit.

Although the drive unit no longer operates by the restriction unit when during parking braking, the vehicle brake apparatus according to the present disclosure can prevent the piston unit from being arbitrarily separated from the pad unit. Thus, a situation where a braking force is no longer applied can be prevented.

In addition, in the vehicle brake apparatus according to the present disclosure, the restriction unit is brought into frictional contact with the surface of the disc unit and thus restricts the rotation of the disc unit. Accordingly, regardless of a position state, and the like of the disc unit, consistent operability can be ensured.

In addition, in the vehicle brake apparatus according to the present disclosure, the disc unit is connected to the output shaft of the drive unit and thus rotates at the same angular speed as the first transmission gear unit. Accordingly, a magnitude of a load applied to the restriction unit can be decreased much more than in a case where the disc unit is connected to the second transmission gear unit or the third transmission gear unit that boosts the rotation force according to a gear ratio.

In addition, in the vehicle brake apparatus according to the present disclosure, the disc unit is mounted in a manner that is movable along the longitudinal direction of the output shaft of the drive unit within the predetermined distance range. When the disc unit is brought into contact with the clamp unit, a position thereof can be adjusted along the longitudinal direction of the output shaft of the drive unit. Thus, both sides of the disc unit can be uniformly pressed.

DETAILED DESCRIPTION OF THE ILLUSTRATED EMBODIMENTS

Figure 1:
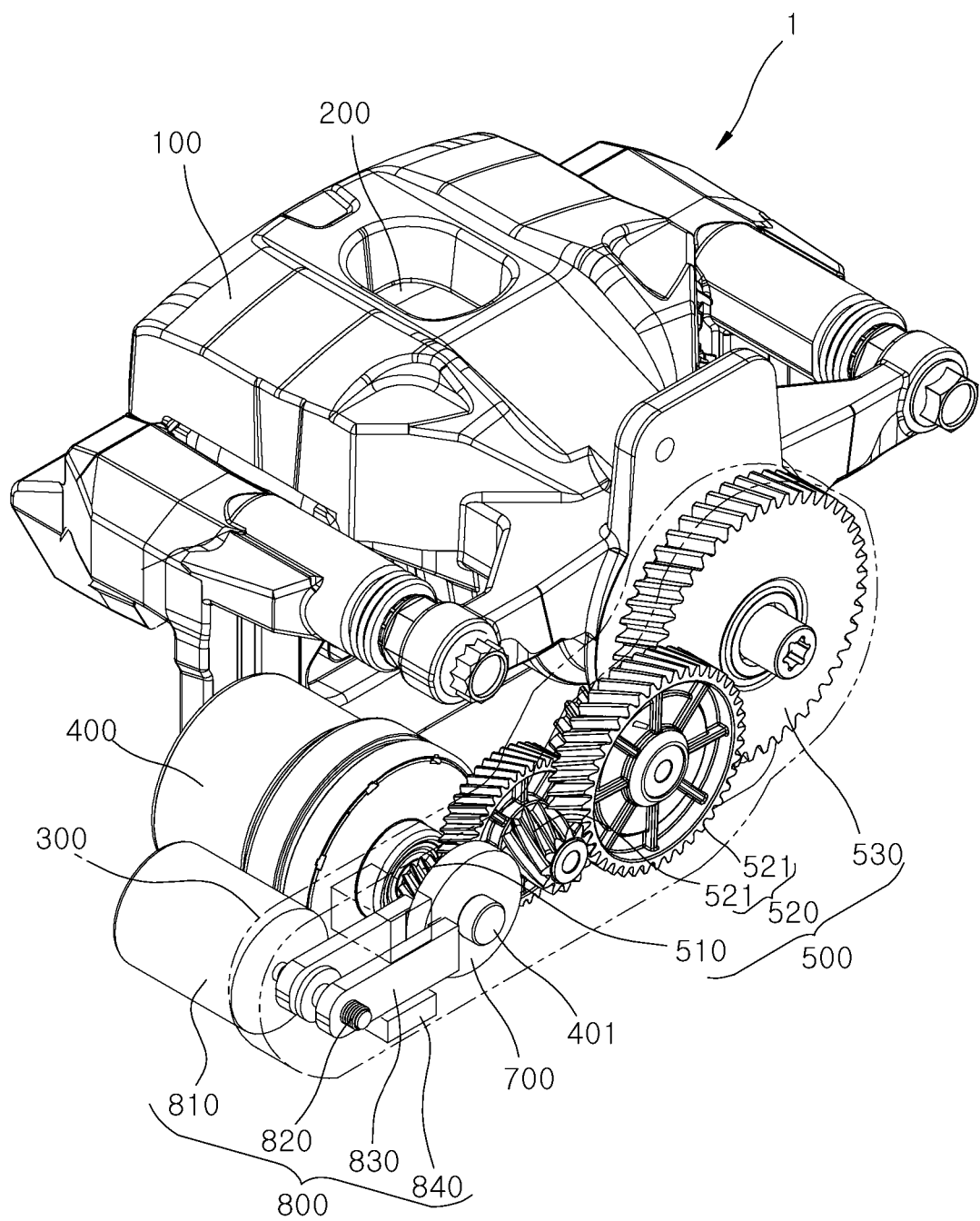
FIG. 1 is a perspective view schematically illustrating a configuration of a vehicle brake apparatus according to an embodiment of the present disclosure.

Hereinafter, a vehicle brake apparatus will be described below with reference to the accompanying drawings through various exemplary embodiments.

For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be stated in light of details disclosed throughout the present specification.

In addition, when referred to as being "connected to (or make contact with)" another constituent element, a constituent element may be "directly connected to (make direct contact with)" the another constituent element or may be "indirectly connected to (or make indirect contact with)" the another constituent with an intervening constituent element member interposed therebetween. Throughout the specification, the expression "include (have)" a constituent element, means "may further include (or have)" any other constituent element, not meaning "exclude any other constituent element," unless otherwise particularly described.

The same reference characters throughout the present specification may refer to the same constituent element. The same reference characters or similar reference characters, although not shown in a specific drawing, may be described with reference to another drawing. In addition, a constituent element, although not given a reference character in a specific drawing, may be described with reference to another drawing. In addition, the number of, shapes of, and sizes, of constituent elements illustrated in the drawings of the present application and a relative difference between the sizes are defined for convenience of understanding, and may be defined in various ways without imposing any limitation on embodiments.

Figure 2:
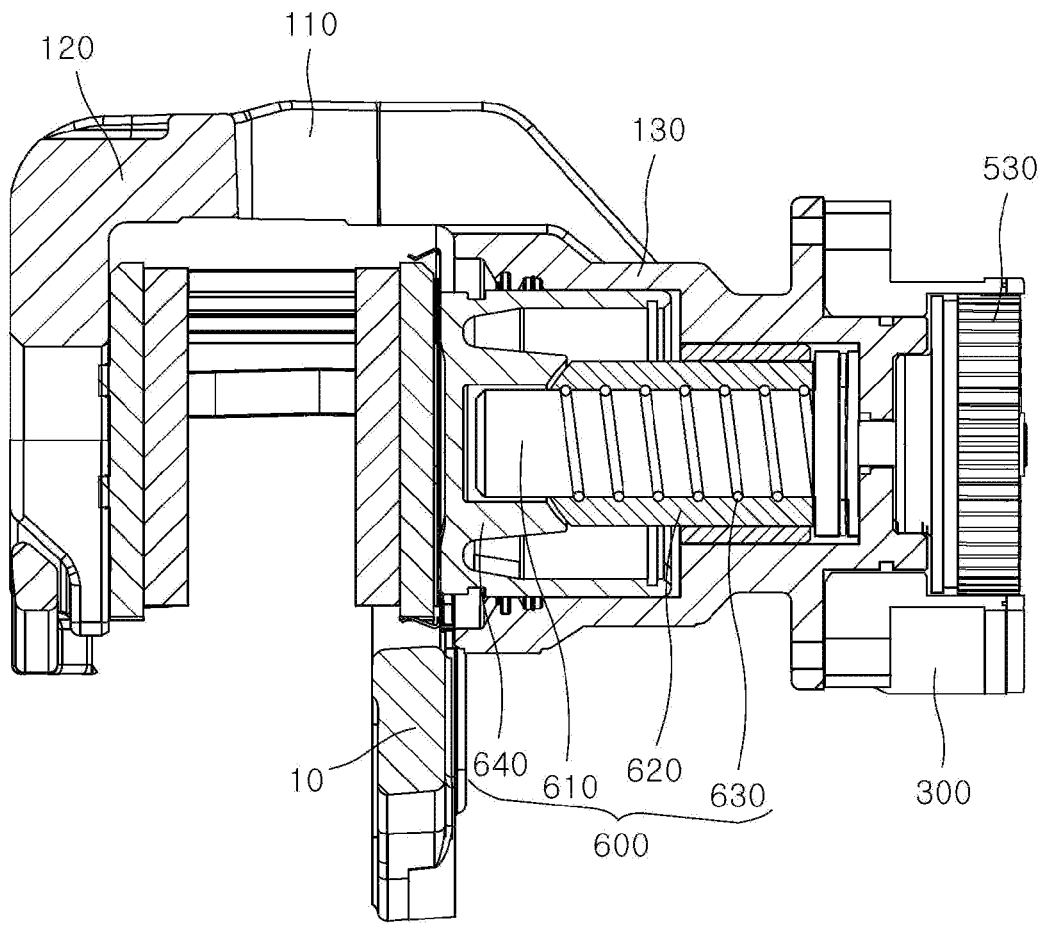
FIG. 2 is an enlarged view schematically illustrating the configuration of the vehicle brake apparatus according to the embodiment of the present disclosure.
Figure 3:
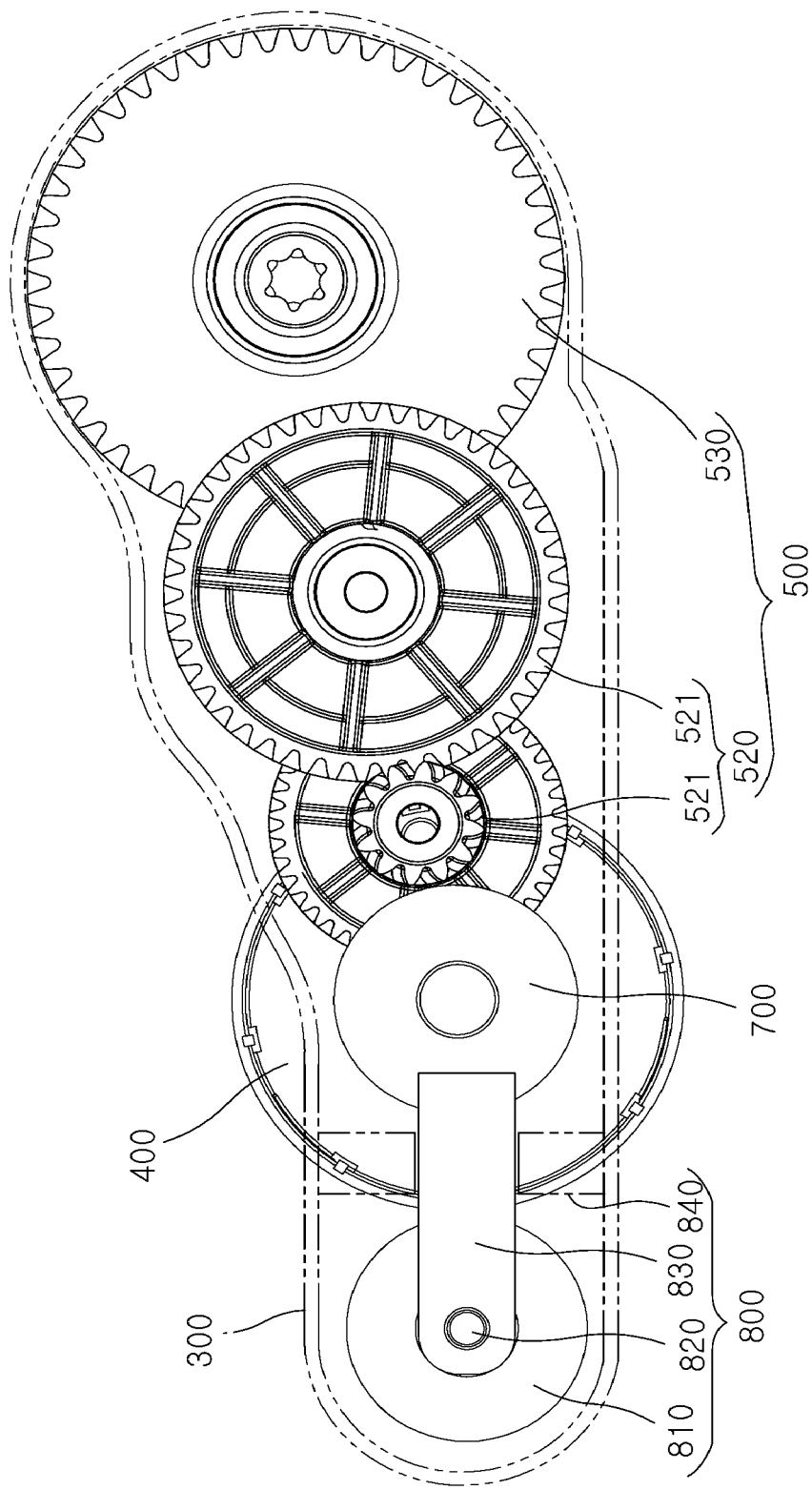
FIG. 3 is a front view schematically illustrating the configuration of the vehicle brake apparatus according to the embodiment of the present disclosure.
Figure 4:
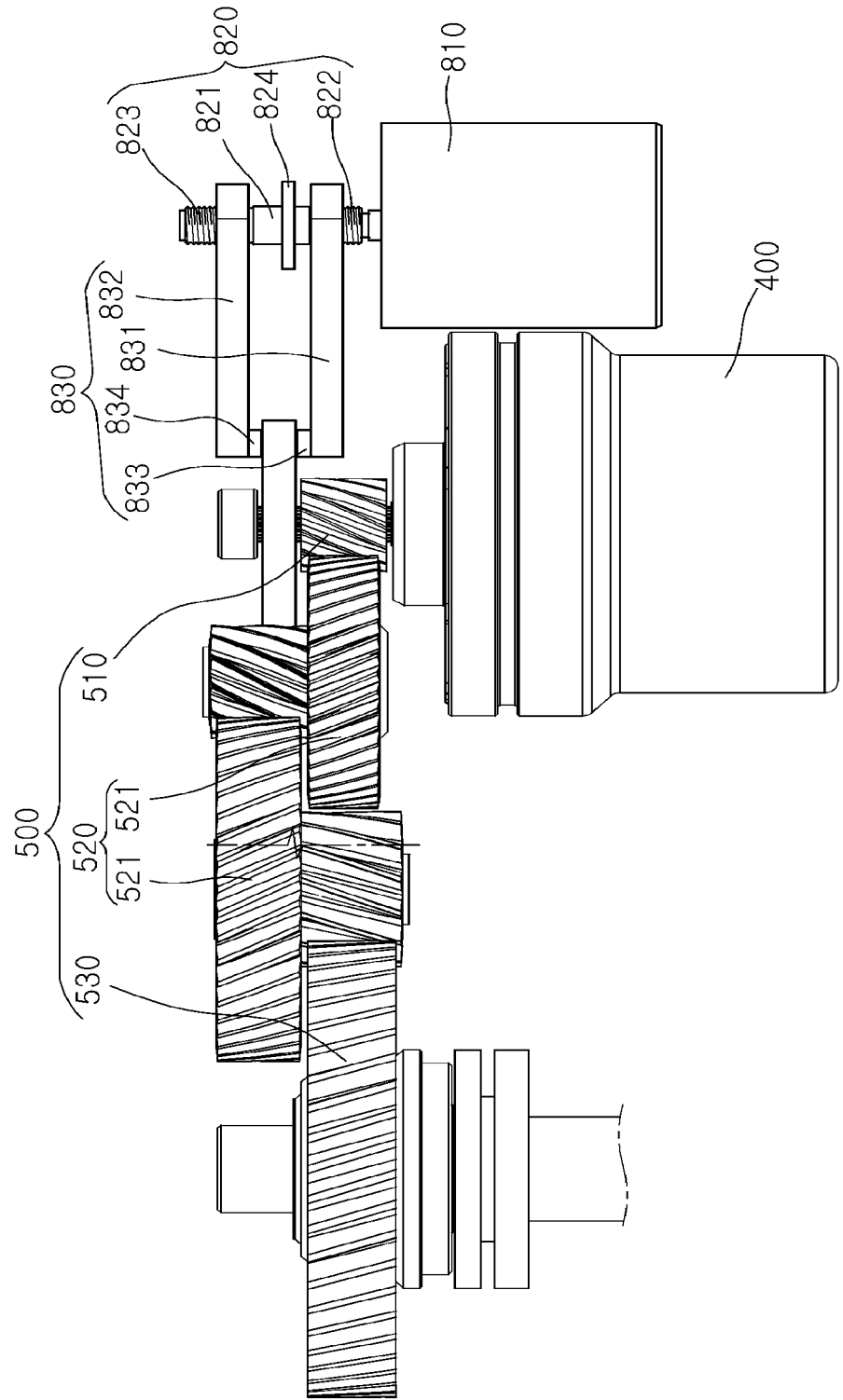
FIG. 4 is a plan view schematically illustrating the configuration of the vehicle brake apparatus according to the embodiment of the present disclosure.

FIG. 1 is a perspective view schematically illustrating a configuration of a vehicle brake apparatus according to an embodiment of the present disclosure. FIG. 2 is an enlarged view schematically illustrating the configuration of the vehicle brake apparatus according to the embodiment of the present disclosure. FIG. 3 is a front view schematically illustrating the configuration of the vehicle brake apparatus according to the embodiment of the present disclosure. FIG. 4 is a plan view schematically illustrating the configuration of the vehicle brake apparatus according to the embodiment of the present disclosure.

With reference to FIGS. 1 to 4, a vehicle brake apparatus 1 according to an embodiment of the present disclosure includes a caliper body unit 100, a pad unit 200, a housing 300, a drive unit 400, a transmission gear unit 500, a piston unit 600, a disc unit 700, and a restriction unit 800.

The caliper body unit 100 is fixed to a vehicle body with a torque member 10 interposed therebetween and supports the pad unit 200, the housing 300, and the piston unit 600 that will be described below. The caliper body unit 100 is combined with a torque member 10 in a slidable manner in a direction parallel to an axial direction of a brake disc, with guide pins interposed therebetween. The guide pins are connected to both sides, respectively, of the caliper body unit 100. The connection of the guide pins to the both sides of caliper body unit 100 makes the caliper body unit 100 supported on the torque member 10 in a slidable manner. The caliper body unit 100 is slid in the direction parallel to the axial direction of the brake disc (not illustrated) by a repulsive force generated due to pressing of the pad unit 200 by the piston unit 600 to be described below.

The caliper body unit 100 according to the embodiment of the present disclosure includes a bridge unit 110, a finger unit 120, and a cylinder unit 130.

The bridge unit 110 forms an upper-side exterior appearance of the caliper body unit 100. The bridge unit 110 according to the embodiment of the present disclosure may be formed in the shape of a plate whose inner lateral surface faces an outer circumferential surface of the brake disc while spaced by a predetermined distance from the outer circumferential surface of the brake disc. A specific shape and area of the bridge unit 110 may vary in design according to a size of the brake disc or the like.

The finger unit 120 forms a front exterior appearance of the caliper body unit 100 and presses or no longer presses the pad unit 200 to be described below in conjunction with the sliding of the caliper body unit 100. The finger unit 120 according to the embodiment of the present disclosure extends vertically downward from a front end portion of the bridge unit 110. The finger unit 120 is arranged in such a manner that an inner lateral surface thereof faces the pad unit 200 arranged outward from the brake disc when viewed from a vehicle width direction, the pad unit 200 being one of a pair of the pad units 200.

The cylinder unit 130 forms a rear exterior appearance of the caliper body unit 100 and supports the piston unit 600 to be described below in a movable manner. The cylinder unit 130 according to the embodiment of the present disclosure extends vertically downward from a rear end portion of the bridge unit 110. The cylinder unit 130 is formed in the shape of a cylinder that is open at one side. The cylinder unit 130 is arranged in such a manner that the open side thereof faces the pad unit 200 arranged inward from the brake disc when viewed from the vehicle width direction, the pad unit 200 being the other one of the pair of the pad units 200.

The pad unit 200 is arranged to face the brake disc that is rotated together with a vehicle wheel. The pad units 200 constituting a pair are arranged to face both lateral surfaces, respectively, of the brake disc with the brake disc interposed therebetween. The pad unit 200 is supported on the caliper body unit 100 so as to be slidable in a direction parallel to a central axis of the brake disc. The pad unit 200 generates or no longer generates a braking force to a vehicle when the pad unit 200 is brought into contact with or separated from the brake disc according to whether or not the pad unit 200 is pressed by the caliper body unit 100 and the piston unit 600 to described below. A friction pad formed of a material having a high friction coefficient, such as rubber, may be formed on one surface of the pad unit 200 that faces the brake disc. A specific shape of the pad unit 200 is not limited to the shapes illustrated in FIGS. 1 to 3. The shape of the pad unit 200 can vary in design within the technical idea of the shape of the brake pad 200 that is brought into contact with the brake disc and thus applies the braking force to a vehicle.

The housing 300 is combined with the caliper body unit 100 and thus supports all of the drive unit 400, the transmission gear unit 500, the disc unit 700, and the restriction unit 800 that will be described below. The housing 300 according to the embodiment of the present disclosure is combined with a rear surface of the caliper body unit 100, and more specifically, with a rear surface of the cylinder unit 130. The housing 300 may be removably combined with the cylinder unit 130 by bolting or like. Alternatively, the housing 300 may be integrally combined with the cylinder unit 130 by welding or the like. The housing 300 is formed to have an empty inside space where the drive unit 400, the transmission gear unit 500, the disc unit 700, and the restriction unit 800 can be mounted. The housing 300 may be provided to be openable and closable. Thus, a component may be easily mounted inside the housing 300 and that the component mounted in the housing 300 may be easily maintained.

The drive unit 400 is mounted on one side of the housing 300. The drive unit 400 is supplied with electric power from the outside and thus generates a drive force. The drive unit 400 may be electrically connected to a vehicle battery or the like and thus may be supplied with electric power. Examples of the drive unit 400 according to the embodiment of the present disclosure may include various types of electric motors that generate a rotational force by electric power supplied. A deviation prevention member 401 may be mounted on an output shaft of the drive unit 400 and prevent deviation of the disc unit 700 to be described below. The deviation prevention member 401 is formed to have a greater diameter than the output shaft of the drive unit 400. Thus, the deviation prevention member 401 may be connected to an end portion of the output shaft.

The transmission gear unit 500 is rotated with a drive force transmitted from the drive unit 400 and transmits the drive force generated by the drive unit 400 to the piston unit 600 to be described below.

The transmission gear unit 500 according to the embodiment of the present disclosure includes a first transmission gear unit 510, a second transmission gear unit 520, and a third transmission gear unit 530.

The first transmission gear unit 510 is connected to the output shaft of the drive unit 400 and thus is rotated together with the output shaft of the drive unit 400. The first transmission gear unit 510 according to the embodiment of the present disclosure may be formed in the shape of a hollow helical gear, a hollow spur gear, or the like that has teeth on the outer circumferential surface thereof. A center portion of the first transmission gear unit 510 is inserted into the output shaft of the drive unit 400 for being supported thereon. A central axis of the first transmission gear unit 510 is arranged on the same axis as the output shaft of the drive unit 400. The first transmission gear unit 510 is rotated at the same angular speed as the output shaft of the drive unit 400 when the drive unit 400 operates.

The second transmission gear unit 520 is engaged with the first transmission gear unit 510 for being combined therewith and is rotated in conjunction with the rotation of the first transmission gear unit 510.

The second transmission gear unit 520 according to the embodiment of the present disclosure may include a plurality of second transmission gears 521.

The second transmission gear 521 may be formed in the shape of a hollow helical gear, a hollow spur gear, or the like that has teeth on the outer circumferential surface thereof. A plurality of second transmission gears 521 is engaged with the first transmission gear unit 510 for being combined therewith and then with the third transmission gear unit 530 to be described below for being combined therewith. In this case, an outer circumferential surface of the second transmission gear 521 may be engaged directly with an outer circumferential surface of the neighboring second transmission gear 521. Alternatively, the second transmission gear 521 may be engaged with the neighboring second transmission gear 521, with a gear having a small diameter interposed therebetween. Of the plurality of second transmission gears 521, one second transmission gear 521 is engaged with the first transmission gear unit 510 for being combined therewith. Central axis of the plurality of second transmission gears 521 are arranged in parallel to the central axis of the first transmission gear unit 510. The plurality of second transmission gears 521 are formed to have a diameter that sequentially increases from the first transmission gear unit 510 toward the third transmission gear unit 530. Accordingly, the plurality of second transmission gear 521 may boost a rotational force transmitted from the first transmission gear unit 510 to the third transmission gear unit 530. FIG. 2 illustrates an example in which two second transmission gears 521 are provided. However, the number of second transmission gears 521 is not limited to 2, and may variously set in design to 3 or more.

The third transmission gear unit 530 is engaged with the second transmission gear unit 520 for being combined therewith. The third transmission gear unit 530 is rotated in conjunction with the rotation of the second transmission gear unit 520 and transmits the rotational force to the piston unit 600 to be described below. The third transmission gear unit 530 according to the embodiment of the present disclosure may be formed in the shape of a hollow helical gear, a hollow spur gear, or the like that has teeth on the outer circumferential surface thereof. The third transmission gear unit 530 is engaged with the second transmission gear unit 520 for being combined therewith. In this case, an outer circumferential surface of the third transmission gear unit 530 may be engaged directly with an outer circumferential surface of the second transmission gear unit 520. Alternatively, the outer circumferential surface of the third transmission gear unit may be engaged with the outer circumferential surface of the second transmission gear unit 520, with a gear having a small diameter interposed therebetween. A central axis of the third transmission gear unit 530 is arranged in parallel to a central axis of the second transmission gear unit 520. When the second transmission gear unit 520 is rotated, the third transmission gear unit 530 is rotated in a direction opposite to that of the second transmission gear unit 520 or in the same direction as that of the first transmission gear unit 510 and thus transmits the rotational force. The central axis of the third transmission gear unit 530 is connected to the piston unit 600 to described below. Thus, when rotated about the central axis, the third transmission gear unit 530 may transmit the rotational force to the piston unit 600. The third transmission gear unit 530 is formed to have a greater diameter than the second transmission gear unit 520. Accordingly, when the second transmission gear unit 520 is rotated, the third transmission gear unit 530 is rotated at a lower angular speed than the second transmission gear unit 520 and thus may boost the rotational force to be transmitted to the piston unit 600.

The piston unit 600 is mounted on the caliper body unit 100 so as to movable forward or backward. The piston unit 600 is moved forward or backward in conjunction with the rotation of the transmission gear unit 500. The piston unit 600 presses or no longer presses the pad unit 200 toward the brake disc according to a direction in which the piston unit 600 is moved forward or backward. Thus, the piston unit 600 applies or no longer applies the braking force.

The piston unit 600 according to the embodiment of the present disclosure includes a ball screw unit 610, a ball nut unit 620, a rolling element 630, and a piston member 640.

The ball screw unit 610 is connected to the transmission gear unit 500 and thus is rotated. The ball screw unit 610 according to the embodiment of the present disclosure is formed to have the shape of approximately a bar and is mounted inside the cylinder unit 130 in a rotatable manner. The ball screw unit 610 is arranged in such a manner that a longitudinal direction thereof is in parallel to a longitudinal direction of the cylinder unit 130. A rear end portion of the ball screw unit 610 is connected to the third transmission gear unit 530. Thus, when the third transmission gear unit 530 is rotated, the ball screw unit 610 undergoes axial rotation about a central axis of the third transmission gear unit 530. A groove is formed in an outer circumferential surface of the ball screw unit 610. A first-side rounded portion of the rolling element 630 to be described above is seated in the groove. The groove extends in a spiral shape along the longitudinal direction of the ball screw unit 610 and provides a path along which the rolling element 630 circulates.

The ball nut unit 620 reciprocates in a straight line along a longitudinal direction of the ball screw unit 610 in conjunction with the rotation of the ball screw unit 610. The ball nut unit 620 according to the embodiment of the present disclosure may be formed in the shape of a cylinder in which the ball nut unit 620 is mounted to surround the outer circumferential surface of the ball screw unit 610. The ball nut unit 620 is arranged in such a manner that an inner circumferential surface thereof faces the outer circumferential surface of the ball screw unit 610 while spaced by a predetermined distance from the outer circumferential surface of the ball screw unit 610. When the ball screw unit 610 is rotated, the rolling element 630 to described below circulates, such that the ball nut unit 620 reciprocates in a straight line in a backward-forward direction along a longitudinal length of the ball screw unit 610. A groove may be formed in an inner circumferential surface of the ball nut unit 620. A second-side rounded portion of the rolling element 630 to be described above is seated in the groove. The groove extends in a spiral shape along a longitudinal direction of the ball nut unit 620 and provides the path along which the rolling element 630 circulates.

The rolling element 630 is provided between the ball screw unit 610 and the ball nut unit 620. Both sides thereof are brought into rolling contact with the ball screw unit 610 and the ball nut unit 620, respectively. The rolling element 630 according to the embodiment of the present disclosure is formed in the shape of approximately a sphere, and is mounted between the ball screw unit 610 and the ball nut unit 620. The first-side rounded portion and the second-side rounded portion of the rolling element 630, respectively, are brought into rolling contact with the grooves, respectively, formed in the outer circumferential surface of the ball screw unit 610 and the inner circumferential surface of the ball nut unit 620. When the ball screw unit 610 is rotated, the rolling element 630 circulates along the groove and converts a rotational motion of the ball screw unit 610 into a straight-line reciprocating motion of the ball nut unit 620.

The piston member 640 reciprocates in a straight line together with the ball nut unit 620 and presses or no longer presses the pad unit 200 according to a moving direction thereof. The piston member 640 according to the embodiment of the present disclosure is mounted inside the cylinder unit 130 in a slidable manner. A rear end portion of the piston member 640 is integrally formed with a front end portion of the ball nut unit 620. Thus, the piston member 640 reciprocates in a straight line along the longitudinal direction of the cylinder unit 130, together with the ball nut unit 620. As the ball nut unit 620 is moved forward, a front end portion of the piston member 640 is brought into contact with the pad unit 200. Thus, the piston member 640 presses the pad unit 200 toward the brake disc. As the ball nut unit 620 is moved backward, the piston member 640 is separated from the pad unit 200 and thus no longer presses the pad unit 200.

The disc unit 700 is rotated together with the transmission gear unit 500 in conjunction with the drive force of the drive unit 400.

Figure 5:
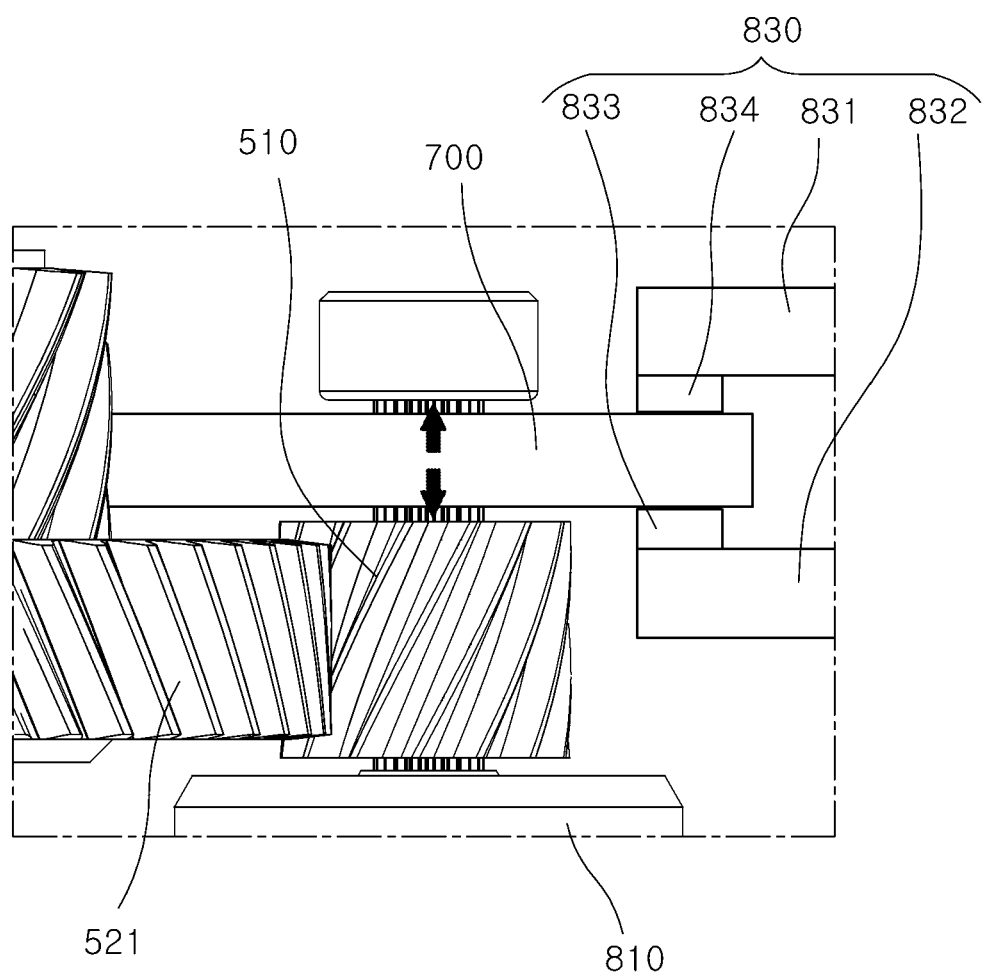
FIG. 5 is an enlarged view schematically illustrating a configuration of a disc unit according to the embodiment of the present disclosure.

FIG. 5 is an enlarged view schematically illustrating a configuration of the disc unit according to the embodiment of the present disclosure.

With reference to FIG. 5, the disc unit 700 according to the embodiment of the present disclosure is formed in the shape of approximately a circular plate, and is connected to the output shaft of the drive unit 400. The disc unit 700 may be rotated in the same angular speed as the first transmission gear unit 510. Accordingly, when the rotation of the disc unit 700 is restrained by the restriction unit 800, the disc unit 700 may decrease a magnitude of a load applied to the restriction unit 800 as compared to a case where the disc unit 700 is connected to the second transmission gear unit 520 or the third transmission gear unit 530 that boosts the rotational force according to a gear ratio.

The disc unit 700 is mounted to be movable along a longitudinal direction of the output shaft of the drive unit 400 within a predetermined distance range. More specifically, an inner circumferential surface of the disc unit 700 is spline-combined with the output shaft of the drive unit 400. Thus, the disc unit 700 may be slid along an axial direction of the output shaft. In this case, when the disc unit 700 is moved by a predetermined distance or longer in an upward-downward direction, both surfaces thereof are brought into contact with the first transmission gear unit 510 and the deviation prevention member 401, respectively. Thus, the disc unit 700 can be prevented from deviating from the output shaft of the drive unit 400. Accordingly, when the restriction unit 800 to be described below operates, the contact of the disc unit 700 with a clamp unit 830 adjusts a position of the disc unit 700 along the longitudinal direction of the output shaft of the drive unit 400. Thus, both sides of the disc unit 700 can be uniformly pressed.

The restriction unit 800 is mounted inside the housing 300 so as to be able to reciprocate with respect to the disc unit 700. During parking braking, the restriction unit 800 is brought into frictional contact with a surface of the disc unit 700 and thus restricts the rotation of the disc unit 700. Accordingly, during parking braking, although the drive unit 400 no longer operates, the restriction unit 800 may prevent the piston unit 600 from being arbitrarily separated from the pad unit 200. Thus, a situation where the braking force is no longer applied can be prevented. In addition, the restriction unit 800 is brought into frictional contact with the surface of the disc unit 700 and thus restricts the rotation of the disc unit 700. Accordingly, regardless of a rotational speed of the disc unit 700 or the like, consistent operability can be ensured.

Figure 6:
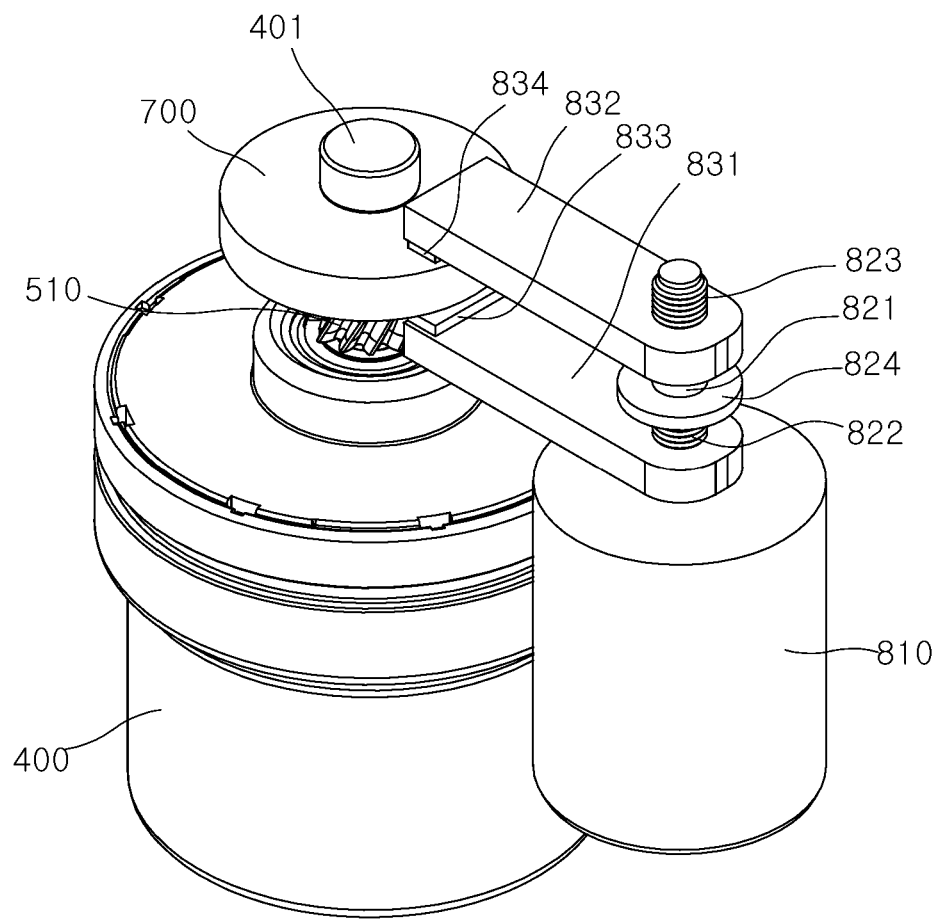
FIG. 6 is a perspective view schematically illustrating a configuration of a restriction unit according to the embodiment of the present disclosure.
Figure 7:
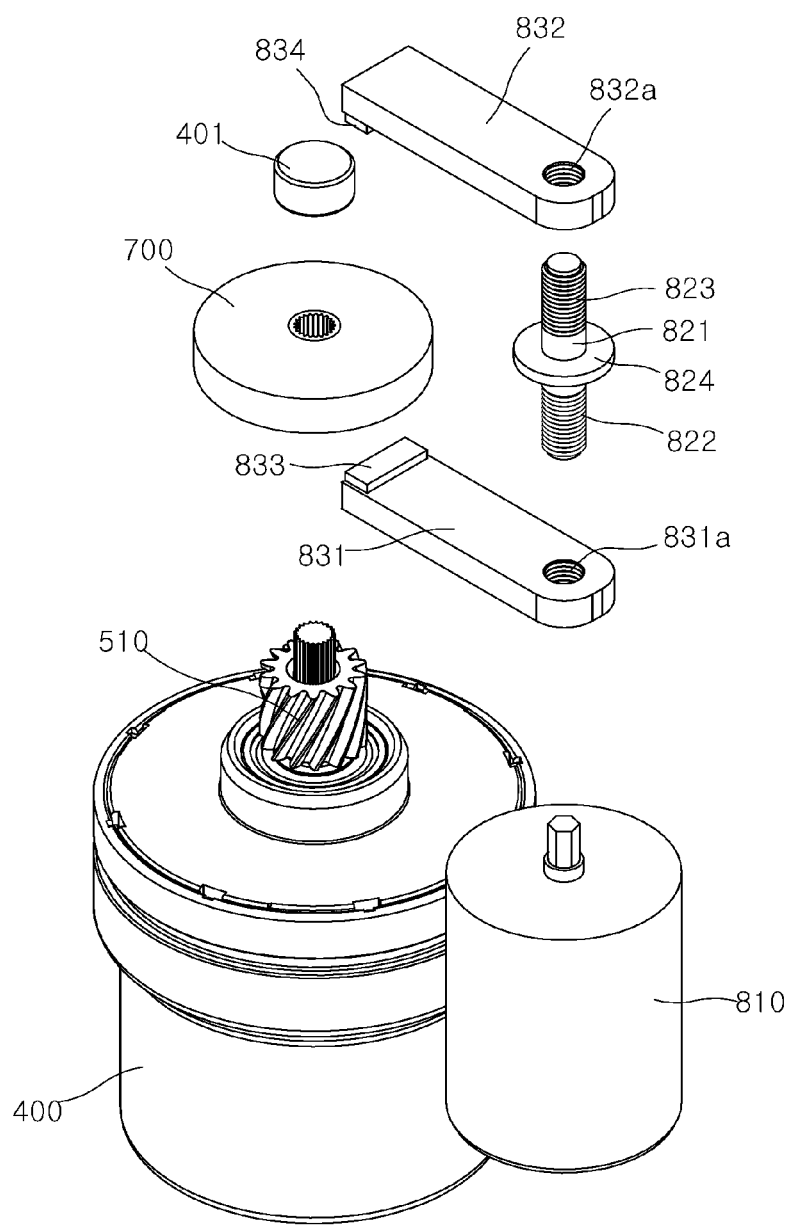
FIG. 7 is an exploded perspective view schematically illustrating the configuration of the restriction unit according to the embodiment of the present disclosure.

FIG. 6 is a perspective view schematically illustrating a configuration of the restriction unit 800 according to the embodiment of the present disclosure. FIG. 7 is an exploded perspective view schematically illustrating the configuration of the restriction unit 800 according to the embodiment of the present disclosure.

With reference to FIGS. 1 to 7, the restriction unit 800 according to the embodiment of the present disclosure includes a parking drive unit 810, a spindle unit 820, the clamp unit 830, and a stopper unit 840.

The parking drive unit 810 is supplied with electric power from the outside and generates a drive force. Examples of the parking drive unit 810 according to the embodiment of the present disclosure include various types of electric motors that are combined with the housing 300 for being supported thereon and generate a forward/backward rotational force by electric power supplied from the outside. The parking drive unit 810 may be electrically connected to a vehicle battery or the like and may be supplied with electric power. The parking drive unit 810 may be arranged to be spaced from the drive unit 400, and an output shaft thereof may be arranged in a direction parallel to the output shaft of the drive unit 400.

The spindle unit 820 is supplied with a drive force from the parking drive unit 810 and thus is rotated.

The spindle unit 820 according to the embodiment of the present disclosure includes a spindle member 821, a first conversion unit 822, a second conversion unit 823, and a partition unit 824.

The spindle member 821 is connected to the output shaft of the parking drive unit 810 and is rotated together with the output shaft of the parking drive unit 810. The spindle member 821 according to the embodiment of the present disclosure may be formed in the shape of approximately a cylinder. A central axis of the spindle member 821 is positioned on the same axis as the output shaft of the parking drive unit 810, and a lower end portion of the spindle member 821 is integrally connected to the output shaft of the parking drive unit 810. When the output shaft of the parking drive unit 810 is rotated, the spindle member 821 is rotated about the central axis thereof. The spindle member 821 is arranged in such a manner that a longitudinal direction thereof is in parallel to a central axis of the disc unit 700.

The first conversion unit 822 and the second conversion unit 823 are arranged on one side and the other side, respectively, of the spindle member 821, and converts a rotational motion of the spindle member 821 into straight-line motions, respectively, of a first clamp member 831 and a second clamp member 832 that will be described below.

The first conversion unit 822 and the second conversion unit 823 according to the embodiment of the present disclosure may be formed in the shape of a screw thread that protrudes from an outer circumferential surface of the spindle member 821. The first conversion unit 822 and the second conversion unit 823 are arranged on a central portion of the spindle member 821, and more specifically, on the bottom and top, respectively, of the spindle member 821, with the partition unit 824 to be described below interposed therebetween.

When the spindle member 821 is rotated, the first conversion unit 822 and the second conversion unit 823 are formed to move the first clamp member 831 and the second clamp member 832, respectively, in a straight line in opposite directions. More specifically, one of the first conversion unit 822 and the second conversion unit 823 is provided in the shape of a clockwise screw, and the other one of the first conversion unit 822 and the second conversion unit 823 is provided in the shape of a counterclockwise screw. FIG. 6 illustrates an example in which the first conversion unit 822 is provided in the shape of a clockwise screw and that the second conversion unit 823 is provided in the shape of a counterclockwise screw. Alternatively, the first conversion unit 822 may be provided in the shape of a counterclockwise screw, and the second conversion unit 823 is provided in the shape of a clockwise screw.

The partition unit 824 is provided between the first conversion unit 822 and the second conversion unit 823. The partition unit 824 serves as a partition between the first conversion unit 822 and the second conversion unit 823. Accordingly, the partition unit 824 may prevent direct collision between the first clamp member 831 and the second clamp member 832 that will be described below. Also, the partition unit 824 may allow the first clamp member 831 and the second clamp member 832 to be moved only along the lengths, respectively, of the first conversion unit 822 and the second conversion unit 823. The partition unit 824 according to the embodiment of the present disclosure may be formed in the shape of a circular plate so as to extend from the outer circumferential surface of the spindle member 821 toward a radial direction of the spindle member 821. The partition unit 824 is arranged on the central side of the spindle member 821, that is, between an upper end portion of the first conversion unit 822 and a lower end portion of the second conversion unit 823.

The clamp unit 830 is arranged to face the disc unit 700. In conjunction with the rotation of the spindle unit 820, the clamp unit 830 is brought into contact with or separated from the disc unit 700 and thus restricts or allows the rotation of the disc unit 700.

The clamp unit 830 according to the embodiment of the present disclosure includes the first clamp member 831, the second clamp member 832, a first friction member 833, and a second friction member 834.

One side of the first clamp member 831 is connected to the spindle unit 820, and the other one thereof is arranged to face one surface of the disc unit 700. When the spindle unit 820 is rotated, the first clamp member 831 reciprocates in a straight line along a longitudinal direction of the spindle unit 820.

The first clamp member 831 according to the embodiment of the present disclosure may be formed in the shape of a plate so that a longitudinal direction of the first clamp member 831 is vertical to an axial direction of the spindle unit 820.

A first through-hole 831*a* is formed in a rear end portion of the first clamp member 831. The spindle member 821 is inserted into the first through-hole 821*a*. A screw thread that corresponds to a screw thread on the first conversion unit 822 protrudes from an inner circumferential surface of the first through-hole 831*a*. A lower end portion of the spindle member 821 is screwed into the first through-hole 831*a* formed in the rear end portion of the first clamp member 831. That is, the screw thread on the first conversion unit 822 is combined in a nut and bolt manner with the screw thread formed on the inner circumferential surface of the first through-hole 831*a*.

The first clamp member 831 is arranged in such a manner that an upper surface of the front end portion thereof horizontally faces a lower surface of the disc unit 700.

The second clamp member 832 is arranged in such a manner that one side thereof is connected to the spindle unit 820 and the other side thereof faces the other surface of the disc unit 700. When the spindle unit 820 is rotated, the second clamp member 832 reciprocates in a straight line along the longitudinal direction of the spindle unit 820.

The second clamp member 832 according to the embodiment of the present disclosure may be formed in the shape of a plate so that a longitudinal direction of the second clamp member 832 is vertical to the axial direction of the spindle unit 820.

A second through-hole 832*a* is formed in a rear end portion of the second clamp member 832. The spindle member 821 is inserted into the second through-hole 832*a*. A screw thread that corresponds to a screw thread on the second conversion unit 823 protrude from an inner circumferential surface of the second through-hole 832*a*. An upper end portion of the spindle member 821 is screwed into the second through-hole 832*a* formed in the rear end portion of the second clamp member 832. That is, the screw thread on the second conversion unit 823 is combined in a nut and bolt manner with the screw thread formed on the inner circumferential surface of the second through-hole 832*a*.

The second clamp member 832 is arranged in such a manner that a lower surface of a front end portion thereof horizontally faces an upper surface of the disc unit 700.

The second clamp member 832 is moved in a straight line in a direction opposite to the first clamp member 831. That is, as the spindle unit 820 is rotated toward one side, the first clamp member 831 and the second clamp member 832 are moved to approach each other toward one surface and the other surface, respectively, of the disc unit 700. As the spindle unit 820 is rotated toward the other side, the first clamp member 831 and the second clamp member 832 are moved away from each other.

The first friction member 833 protrudes, toward one surface of the disc unit 700, from the first clamp member 831. As the first clamp member 831 is moved by a predetermined distance or longer toward the disc unit 700, the first friction member 833 is brought into close contact with one surface of the disc unit 700 and thus restricts the rotation of the disc unit 700. The first friction member 833 according to the embodiment of the present disclosure protrudes, toward the lower surface of the disc unit 700, vertically from the upper surface of the front end portion of the first clamp member 831. The first friction member 833 may be formed of an elastically deformable material, such as silicone or rubber, which has not only a high friction coefficient, but also an enhanced property of close contact with the disc unit 700.

The second friction member 834 protrudes, toward the other surface of the disc unit 700, from the second clamp member 832. As the second clamp member 832 is moved by a predetermined distance or longer toward the disc unit 700, the second friction member 834 is brought into close contact with the other surface of the disc unit 700 and thus restricts the rotation of the disc unit 700. The second friction member 834 according to the embodiment of the present disclosure protrudes, toward the upper surface of the disc unit 700, vertically from a lower surface of the front end portion of the second clamp member 832. The second friction member 834 may be formed of an elastically deformable material, such as silicone or rubber, which has not only a high friction coefficient, but also an enhanced property of close contact with the disc unit 700.

The stopper unit 840 is brought into contact with the clamp unit 830 and thus restricts the rotation of the clamp unit 830. More specifically, the stopper unit 840 restricts the clamp unit 830 from deviating from its home position due to a rotational force generated when the spindle unit 820 is rotated and from being thus rotated together with the spindle unit 820. Accordingly, when the spindle unit 820 is rotated, the stopper unit 840 may induce the clamp unit 830 to be moved in a straight line while the clamp unit 830 keeps facing the disc unit 700. The stopper unit 840 according to the embodiment of the present disclosure may be formed in the shape of a bar that has one side fixed to an inner lateral surface of the housing 300 and the other side extending toward the clamp unit 830. A plurality of stopper unit 840 may be provided. One stopper unit 840 is brought into contact with both lateral surfaces of the first clamp member 831, and the other stopper unit 840 is brought into contact with both lateral surfaces of the second clamp member 832. Both the stopper units 840 restrict the first clamp member 831 and the second clamp member 832, respectively, from being rotated about their respective sides connected to the spindle member 821. A specific shape of the stopper unit 840 is not limited to the shape described above. The shape of the stopper unit 840 may vary in design within the technical idea of the shape of the stopper unit 840 that can restrict the clamp unit 830 from being rotated together with the spindle unit 820 due to the rotational force generated when the spindle unit 820 is rotated.

An operating process of the vehicle brake apparatus 1 according to the embodiment of the present disclosure will be described in detail below.

Figure 8:
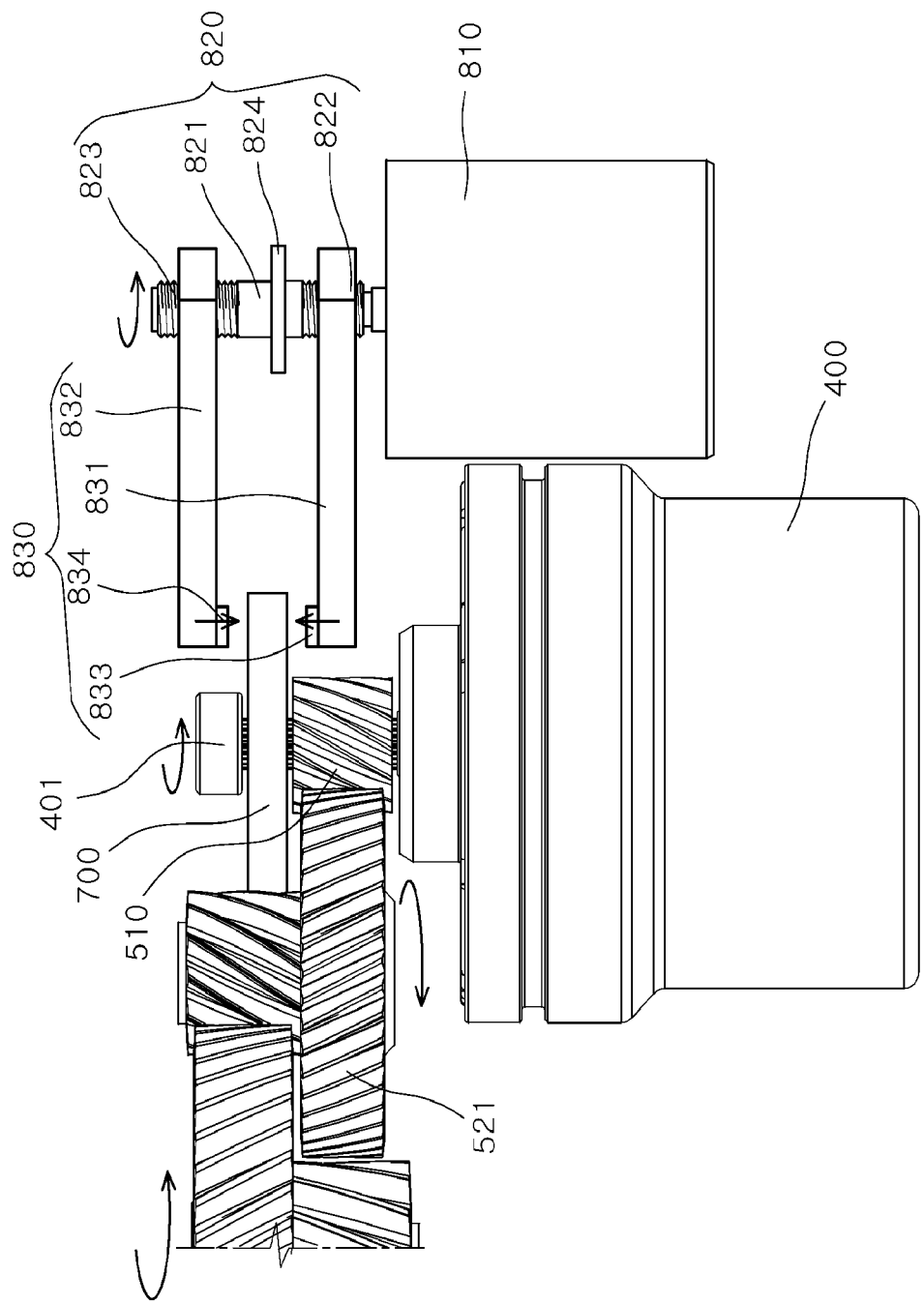
FIGS. 8 and 9 are operational views each schematically illustrating an operating process of the vehicle brake apparatus according to the embodiment of the present disclosure.
Figure 9:
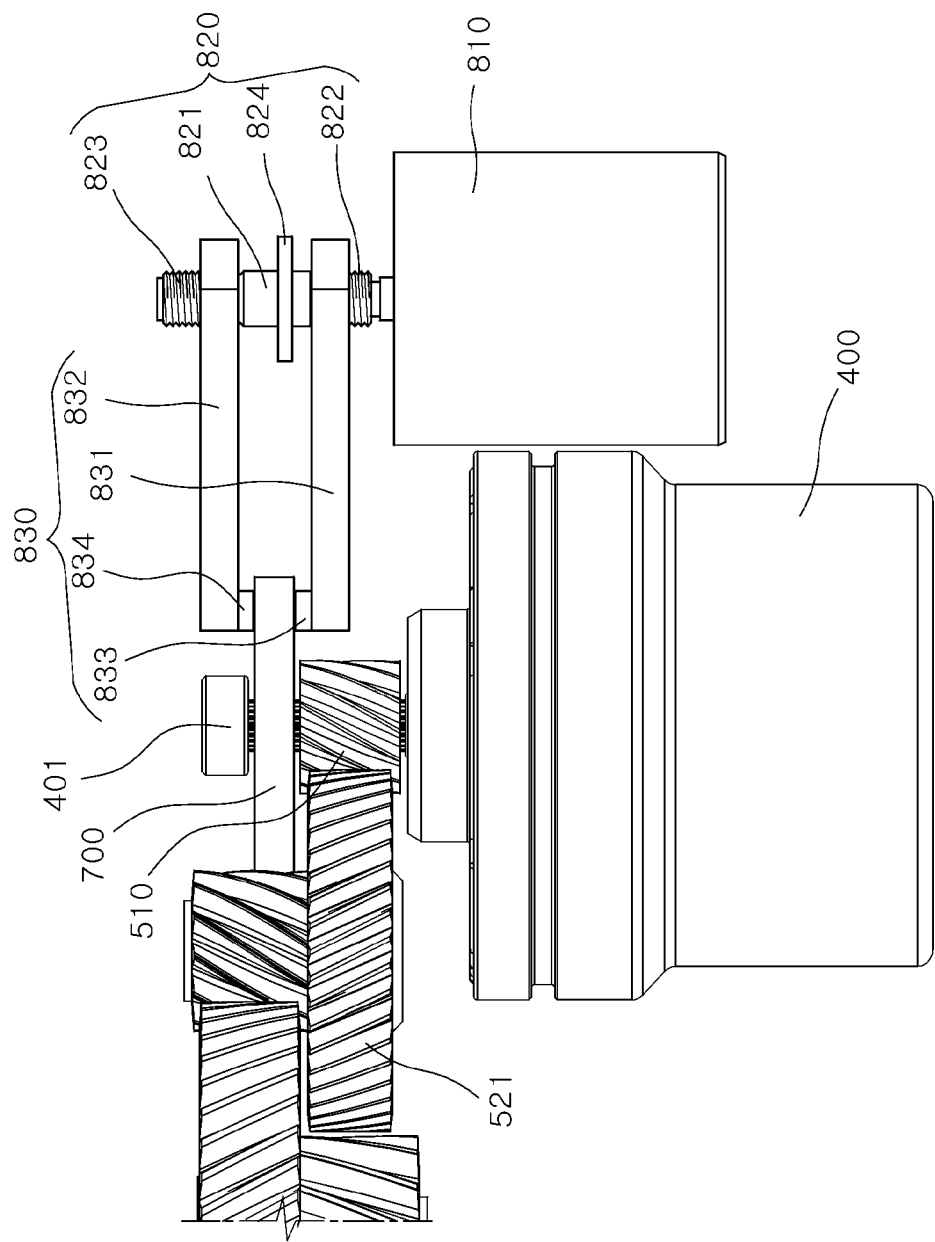

FIGS. 8 and 9 are operational views each schematically illustrating an operating process of the vehicle brake apparatus according to the embodiment of the present disclosure.

Referring to FIGS. 1 to 9, during parking braking, the drive unit 400 generates a drive force and thus rotates the transmission gear unit 500.

The drive force generated by the drive unit 400 is transmitted to the ball screw unit 610 of the piston unit 600 through the first transmission gear unit 510, the second transmission gear unit 520, and the third transmission gear unit 530 in this order.

As the ball screw unit 610 is rotated about the central axis thereof, the rolling element 630 circulates, and thus the ball nut unit 620 is moved forward.

The piston member 640 is moved forward together with the ball nut unit 620 and is brought into contact with the pad unit 200. Then, the position member 640 presses the pad unit 200 toward the brake disc, and thus generates a braking force for parking.

Subsequently, as a sufficient braking force for parking is generated, the parking drive unit 810 generates a drive force and thus rotates the spindle unit 820 clockwise or counterclockwise.

As the spindle unit 820 is rotated, the first clamp member 831 and the second clamp member 832 are moved in a straight line toward the disc unit 700 in the direction that the first clamp member 831 and the second clamp member 832 approach each other. During this operating process, the first clamp member 831 and the second clamp member 832 are brought into contact with the stopper unit 840 and thus may be prevented from being rotated together with the spindle unit 820.

As the first clamp member 831 and the second clamp member 832 are moved by a predetermined distance or longer toward the disc unit 700, the first friction member 833 and the second friction member 834 are brought into contact with lower and upper surfaces, respectively, of the disc unit 700.

Due to backlash in assembling the first clamp member 831 and the second clamp member 832, or the like, one of the first friction member 833 and the second friction member 834 may be brought into contact with the disc unit 700 ahead of the other one. In this case, the disc unit 700 is slid along a longitudinal direction of the output shaft of the drive unit 400 toward the other one of the first friction member 833 and the second friction member 834. A position of the disc unit 700 is adjusted up to a point where magnitudes of pressing pressures applied from the first friction member 833 and the second friction member 834 to both lateral surfaces, respectively, of the disc unit 700 become the same.

Subsequently, the drive unit 400 stops generating the drive force, and due to a repulsive force generated between the piston member 640 and the pad unit 200, a rotational force in a direction opposite to a rotational force transmitted during parking braking is transmitted to the disc unit 700.

A rotational force of the disc unit 700 is canceled out by a frictional force acting between the disc unit 700 and each of the first friction member 833 and the second friction member 834, and thus the rotation of the disc unit 700 is restricted.

The restriction of the rotation of the disc unit 700 in turn restricts the rotation of the transmission gear unit 500 engaged with the disc unit 700, and thus a state where parking brake is applied can be maintained.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A vehicle brake apparatus comprising:
a drive unit configured to generate a drive force;
a transmission gear unit rotatable with the drive force transmitted from the drive unit;
a piston unit movable forward or backward in conjunction with a rotation of the transmission gear unit, and configured to press or no longer press a pad unit according to a direction in which the piston unit moves;
a disc unit rotatable together with the transmission gear unit in conjunction with the drive force of the drive unit; and
a restriction unit mounted to be movable toward the disc unit, and configured to restrict a rotation of the disc unit by being brought into frictional contact with the disc unit during parking braking,
wherein the restriction unit comprises:
a parking drive unit configured to generate a drive force;
a spindle unit rotatable with the drive force transmitted from the parking drive unit; and
a clamp unit arranged to face the disc unit, and brought into contact with or separated from the disc unit in conjunction with a rotation of the spindle unit,
wherein the clamp unit comprises:
a first clamp member arranged to face a first surface of the disc unit, and movable in a straight line along a longitudinal direction of the spindle unit when the spindle unit rotates; and
a second clamp member arranged to face a second surface of the disc unit, and movable in a straight line in a direction opposite to the first clamp member when the spindle unit rotates.

2. The vehicle brake apparatus of claim 1, wherein the clamp unit further comprises:
a first friction member protruding toward the first surface of the disc unit from the first clamp member, and brought into close contact with the first surface of the disc unit as the first clamp member is moved by a predetermined distance or more toward the disc unit; and
a second friction member protruding toward the second surface of the disc unit from the second clamp member, and brought into close contact with the second surface of the disc unit as the second clamp member is moved by a predetermined distance or more toward the disc unit.

3. The vehicle brake apparatus of claim 1, wherein the spindle unit comprises:
a spindle member rotatable together with an output shaft of the parking drive unit;
a first conversion unit arranged on a first side of the spindle member and configured to convert a rotational motion of the spindle member into a straight-line motion of the first clamp member; and a second conversion unit arranged on a second side of the spindle member and configured to convert the rotational motion of the spindle member into a straight-line motion of the second clamp member.

4. The vehicle brake apparatus of claim 3, wherein the spindle member is arranged such that a longitudinal direction thereof is in parallel to a central axis of the disc unit.

5. The vehicle brake apparatus of claim 3, wherein one of the first conversion unit or the second conversion unit has a shape of a clockwise screw, and a remaining one of the first conversion unit or the second conversion unit has a shape of a counterclockwise screw.

6. The vehicle brake apparatus of claim 1, wherein the restriction unit further comprises:

a stopper unit brought into contact with the clamp unit and configured to restrict a rotation of the clamp unit.

7. The vehicle brake apparatus of claim 1, wherein the piston unit comprises:

a ball screw unit rotatable by being connected to the transmission gear unit;

a ball nut unit reciprocating in a straight line along a longitudinal direction of the ball screw unit in conjunction with a rotation of the ball screw unit; and one or more rolling elements arranged between the ball screw unit and the ball nut unit and brought into rolling contact with the ball screw unit and the ball nut unit.

8. A vehicle brake apparatus comprising:

a drive unit configured to generate a drive force;

a transmission gear unit rotatable with the drive force transmitted from the drive unit;

a piston unit movable forward or backward in conjunction with a rotation of the transmission gear unit, and configured to press or no longer press a pad unit according to a direction in which the piston unit moves;

a disc unit rotatable together with the transmission gear unit in conjunction with the drive force of the drive unit; and a restriction unit mounted to be movable toward the disc unit, and configured to restrict a rotation of the disc unit by being brought into frictional contact with the disc unit during parking braking, wherein the transmission gear unit comprises:

a first transmission gear unit rotatable together with an output shaft of the drive unit;

a second transmission gear unit engaged with the first transmission gear unit for being combined therewith, and rotatable in conjunction with a rotation of the first transmission gear unit; and a third transmission gear unit engaged with the second transmission gear unit for being combined therewith, rotatable in conjunction with a rotation of the second transmission gear unit, and configured to transmit a rotational force to the piston unit, and wherein the disc unit is connected to the output shaft of the drive unit and rotates at a same angular speed as the first transmission gear unit.

9. The vehicle brake apparatus of claim 8, wherein the disc unit is mounted to be movable along a longitudinal direction of the output shaft of the drive unit within a predetermined distance range.

10. The vehicle brake apparatus of claim 9, wherein the disc unit is spline-combined with the output shaft of the drive unit.

* * * * *